United States Patent [19]

Contato

[11] 4,423,295
[45] Dec. 27, 1983

[54] CONTROL DEVICE FOR OPTICAL AND ACOUSTIC SIGNALERS

[75] Inventor: Ugo Contato, Turin, Italy

[73] Assignee: Fiat Auto S.p.A., Turin, Italy

[21] Appl. No.: 330,398

[22] Filed: Dec. 14, 1981

[30] Foreign Application Priority Data

Dec. 16, 1980 [IT] Italy .................. 53812/80[U]

[51] Int. Cl.³ .................................. H01H 3/16
[52] U.S. Cl. .................................... 200/61.27
[58] Field of Search ............... 200/61.27, 61.38, 61.54

[56] References Cited

U.S. PATENT DOCUMENTS

| 2,667,545 | 1/1954 | Leonard | 200/61.31 |
| 2,784,269 | 3/1957 | Pandolfi | 200/61.31 |
| 3,530,266 | 9/1970 | Vitaloni | 200/61.27 X |

FOREIGN PATENT DOCUMENTS 1532111  7/1968  France .................. 200/61.27

Primary Examiner—J. R. Scott
Attorney, Agent, or Firm—Shlesinger, Arkwright, Garvey and Fado

[57] ABSTRACT

A control apparatus for a plurality of vehicle signaling devices in combination with a vehicle steering assembly and including a rotatable steering wheel has stopping members associated with the steering wheel and extending therefrom and which cooperate with a pair of return levers which are rotatable into a circle defined by rotation of said stopping members and which are contacted by said stopping members in order to pivot a signaling device control lever into a neutral position.

13 Claims, 12 Drawing Figures

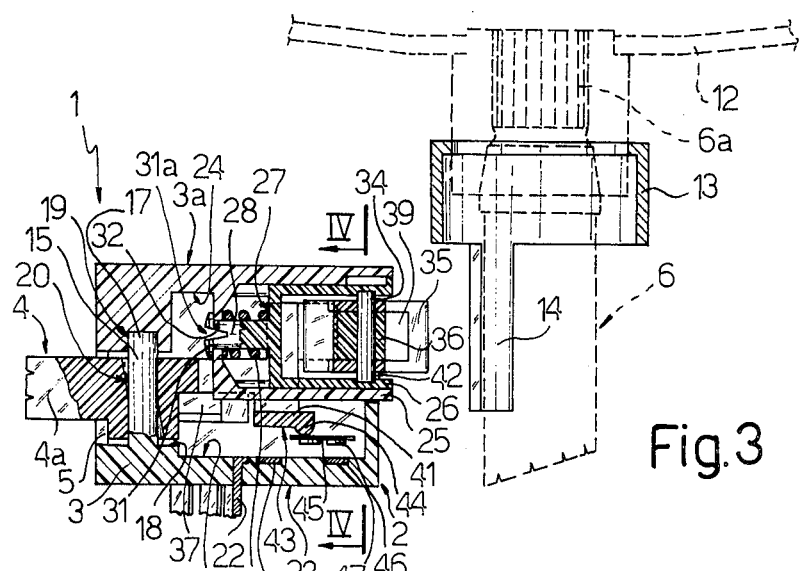

CONTROL DEVICE FOR OPTICAL AND ACOUSTIC SIGNALERS

BACKGROUND OF THE INVENTION

The present invention relates to a control device for optical and acoustical signal devices, particularly for the direction indicators and the horn of vehicles.

It is known to control the optical direction signaling devices or turn signal indicators of a motor vehicle by means of a direction signal control unit which is an integral part of the steering assembly of the vehicle and to control the acoustic signaler or horn by means of a second unit which is mounted on the steering column, usually on the same end to which the steering wheel is mounted. There is also frequently mounted on the steering wheel a third device which is a combination anti-theft/ignition switch device.

The direction signal control unit comprises generally two annular elements co-axial with the steering column of the vehice and arranged to cooperate with one another. One of the annular elements is rigidly connected to the steering wheel or the steering control arm by means of a third element called a link and which is mounted within the steering column. The automatic return of the two annular elements on which the direction signal control lever is mounted is possible because of the connection to the link. Suitable electric contacts or connections are provided on the steering wheel and are connected to one another by the displacement of the element which supports the control lever and which is used to accomplish the operation of the direction indicators.

The location of three separate devices on the steering column of the vehicle gives rise to several disadvantages. The correct operation of the ignition/anti-theft devices and the direction indicator control devices, in particular, require perfect centering of those devices on the steering column. As the two devices are independent from one another and are mounted separately, the perfect centering of both devices involves considerable assembly difficulties.

The location of the direction signal control unit involves additional assembly difficulties and also requires, moreover, an accurate and expensive manufacturing of the steering column itself as the steering column must be able to contain the workings of the direction signal control unit and also insure that the annular elements are co-axial. Finally, in the event of a malfunction or a failure, especially of an electrical failure, it is necessary to disassemble the steering wheel and the horn control unit in order to access the direction signal control device so as to carry out the necessary repair operations. Furthermore, the presence of electrical cables extending from the three devices and all being located within the steering column may give rise to an undesirable electrical contact and often even to electrical short circuits.

SUMMARY OF THE INVENTION

The object of the present invention is to provide a control device for the optical direction signaling devices which will be free from the disadvantages described hereinabove.

This object is attained according to the present invention by a control device, particularly a control device for optical direction signaling devices for motor vehicles, which is arranged to be mounted in a location nearby the steering column of the vehical. The device comprises a housing adapted to be connected or mounted to a steering column, a lever projecting from the housing and supporting on one end a fork located in the housing, a plurality of fixed electric contacts supported by a bottom wall of the housing and adapted to be connected to electric supply means and to said optical signal units, at least one movable electric contact controlled by the fork and adapted to assume any one of three operating positions, each of the operating positions corresponding to a predetermined electric connection with the fixed electric contact, and automatic return means for the control lever which cooperates with the fork and which are arranged to be mechanically operated against the action of resilient or spring positioning means by a projecting member angularly coupled to a steering column control arm of the steering column.

BRIEF DESCRIPTION OF THE DRAWINGS

For a better understanding of the present invention, a detailed description of an embodiment thereof will now be described by way of a non-limiting example with reference to the annexed drawings in which:

FIG. 3 is an axial cross-sectional view of the device of FIG. 1 shown located near a steering column provided with a steering wheel;

FIG. 4 is a front cross-sectional view taken along the Section 4—4 of FIG. 1;

FIG. 5 is a top cross-sectional view of the device of FIG. 1 in which some parts have been omitted for improved clarity of presentation;

FIG. 9 is a cross-sectional view taken along the Section 9—9 of FIG 1; and,

DETAILED DESCRIPTION OF THE INVENTION

Figure 1:
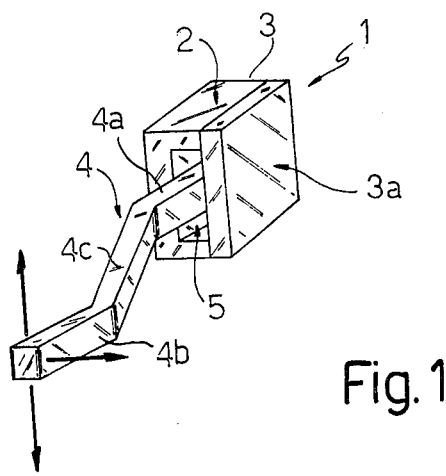
FIG. 1 is a perspective view of a control device according to the teachings of the present invention.

Referring now to FIG. 1, references numeral 1 indicates a control device for optical direction signal indicators according to the present invention and comprising a housing 2. The housing 2 may be molded of plastic and is formed as a cup-shaped body 3 with a cover 3a. Control lever 4 projects from the housing 2 through a slot 5 formed in housing 2. Control lever 4 may be made of plastic by a molding operation and has a rectangular cross-section and two ends 4a and 4b which are parallel to one another and connected by central body 4c which is oblique relative to ends 4a and 4b. Lever 4 is movable on two axes as indicated by the arrows in FIG. 1.

Figure 2:
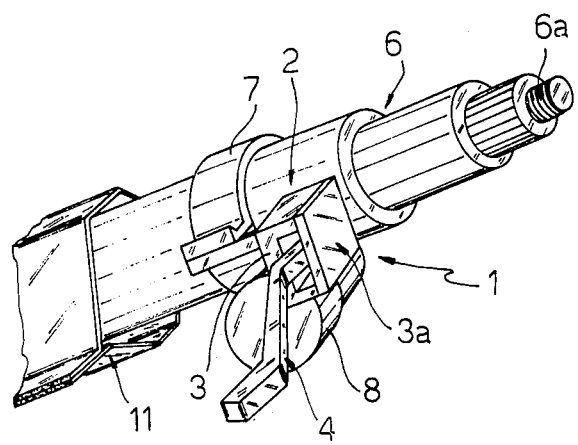
FIG. 2 is a perspective view of the device of FIG. 1 mounted on a steering column of a vehicle, for example a motor vehicle.

The control device 1, as best shown in FIG. 2, is mounted on a steering column 6 of a motor vehicle by means of a fastening ring or collar 7. A starting unit 8 comprising an anti-theft device and an ignition switch is also secured to ring 7. Steering column 6 is supported by a box-type element 11 which is part of the body of the vehicle and which has a steering control arm 6a rotatable therein.

The control device 1, as best shown in FIG. 3 which is a longitudinal cross-sectional view, may conveniently be mounted adjacent to or by the side of the column 6, which is shown in dashed lines. Column 6 supports on the steering control arm 6a a steering wheel 12 and which has coupled thereto a collar 13 which is rotatable therewith and which is provided with stopping element or return means 14 formed by two arms which are integral with collar 13.

Cylindrical pin 15 is positioned inside cup-shaped body 3 near the slot 5 and is integral with body 3 and is disposed perpendicularly to surface 18 of bottom wall 16 of body 3. Pin 15 projects from the body 3 and has an end 17 to which to the cover 3a is secured by means of a calibrated bore or aperture 19.

Lever 4 is hinged or pivotably mounted on pin 15 in such a way that it may move in the direction of the arrows shown in FIG. 1, i.e. in such a way that it may rotate in a horizontal plane, i.e. a plane parallel to surface 18 and if may rotate or pivot perpendicularly to the surface 18 so as to move away from the latter. The pivoting away from the surface 18 is accomplished by means of an oblique bore 20 formed in the end of 4a of the lever 4 and which has a predetermined inclination relative to the surface 18. The axis of the bore 20 is, in particular, contained within the longitudinal plane of symmetry of the lever 4.

A plurality of fixed electric contacts 21 are mounted on the surface 18 of the cup-shaped body 3 and are electrically connected to pins 22 (See FIG. 3) which traverse bottom wall 16 of cup-shaped body 3 and project from it perpendicularly to an outer surface 23 of bottom wall 16. Cover 3a has an inner surface 24 and a support 25 integral with cover 3a. Support 25 is a generally U-shaped structure and is disposed perpendicularly to slot 5 and, in particular, is formed in a location corresponding to the pin 15. Slideably mounted on support 25 is a U-shaped element or enclosure 26 on whose rear surface 27 there is integrally formed a cylindrical pin 28 having a head 31. Head 31 is provided with a notch 31a which engages is a snap-in fashion a bore 32 formed in support 25 so as to retain element or enclosure 26 without, however, preventing enclosure 26 from being free to slide. A spring 33 is mounted on pin 28 and maintains element or enclosure 26 toward the outer end of support 25 and, consequently, spring 33 and head 31 permit the exact positioning of the enclosure 26 while still permitting it to be moved reciprocally backward against the action of spring 33.

Pin 34 is positioned on element or enclosure 26 and is parallel to the pin 15. Two shaped levers 35 and 36 are pivotably hinged on pin 34 and are thus secured to the enclosure or element 26 and follow its movements therefor. Shaped levers 35 and 36 project outwardly from the cover 3a through slot 42 which is parallel to the slot 5 and which is formed partially with the cover 3a and partially with the cup-shaped body 3. Shaped lever 35 has, in addition, a cavity or aperture 39 (See FIG. 3) in which the lever 36 is mounted so that it crosses the lever 35. Referring to FIGS. 4 and 5, a shaped fork 37 is mounted within cup-shaped body 3 and is integral with the lever 4 on the end 4a. Fork 37 is generally parallel to surface 18 and is substantially U-shaped when viewed in plan and has two ends 38 and 38a. Ends 38 and 38a are arranged in such a way as to be adapted to cooperate with ends 35a and 36a of shaped levers 35 and 36. The body of fork 37 lies on a plane contained in the cup-shaped body 3 while the ends 38 and 38a lie on a plane contained in the cover 3a parallel and superposed to the plane in which the fork 37 lies. The plane on which the ends 38 and 38a are lying is the plane on which the element 26 is movable, i.e. the plane on which the shaped levers 35 and 36 lie. Consequently, rotation of the fork 37 about the pin 15 controls the rotation of shaped levers 35 and 36 about the pin 34.

Cross piece or arm 41 is rigidly secured to the fork 37 and is perpendicular to lever 4. Cross piece 41 has a lower surface 43 on which there is provided a hammer or contact element 44 which is always in contact with a resilient lamination or leaf spring switch contact 45 which may conveniently be made of phosphor bronze. Leaf spring or lamination 45 supports two auxiliary movable electrical contacts 46 and bottom surface 16 of housing 2 supports a plurality of auxiliary fixed contacts 47. All of the fixed contacts 47 are conveniently made of brass.

Fork 37 includes a movable electrical contact 48 which is arranged to slide on the fixed electric contracts 21. Contact 48 is formed of a U-shaped brass lamination or member 51 positioned on lower surface 52 of fork 37 and is biased by spring 53 so that lamination or member 51 is maintained in constant contact with surface 18 to which the contacts 21 are positioned. The spring 53 (FIG. 9) is housed in an aperture 54 formed in fork 37 and is retained in position by plug 55 secured in value 54.

Figure 8:
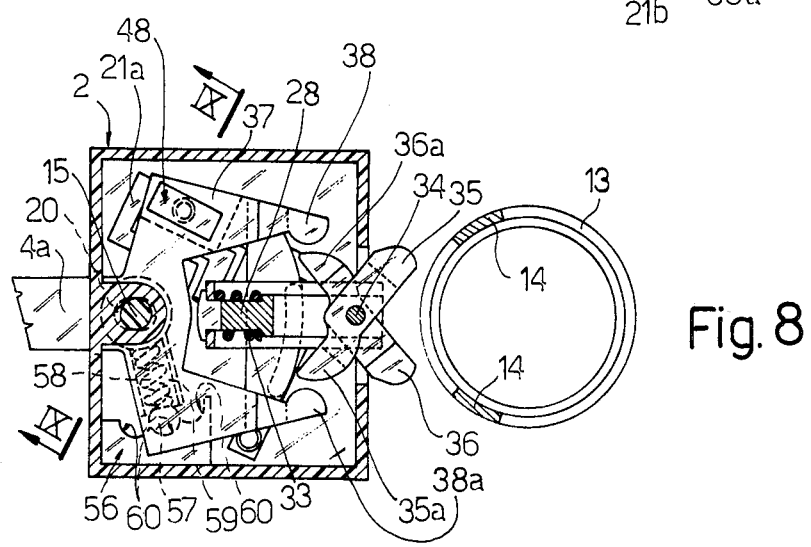
FIG. 8 is a view similar to that of FIG. 5 but with some of the elements of the device of the present invention in different positions.

Fork 37 is associated with a positioning device or holding means 56 comprising (FIG. 8) a ball 57, a spring 58 housed in horizontal bore 59 of fork 37 and a series of seatings 60 for the ball 57 which are formed on the cup-shaped body 3.

Figure 6:
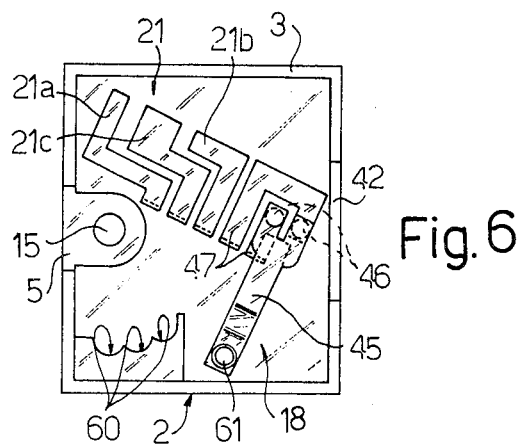
FIGS. 6 and 7 are, respectively, a top plan view of the housing which is part of the device of the present invention and a view of the housing with an element of the device of FIG. 1 inserted therein.
Figure 7:
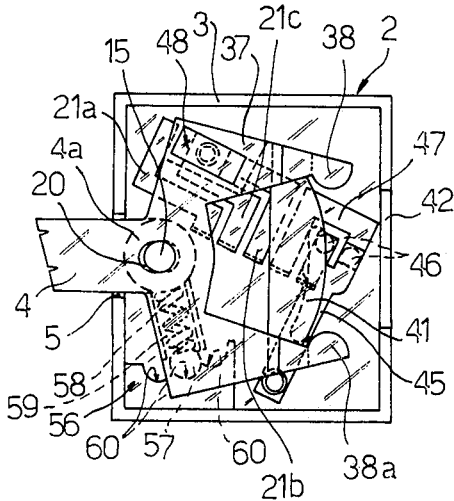

FIGS. 6 and 7 also disclose the electric contacts located within the body 3. The fixed contacts 21 are formed by plane laminations or members which are secured to the surface 18 of the bottom 16. Fixed contacts 21 include changeover contacts 21a and 21b connected to common contact 21c which is disposed between changeover contacts 21a and 21b and which is connected to a pole, for example, the positive, of an electric supply means or an automobile battery. Movable contact 48 is adapted to selectively connect one of the two changeover contacts 21a and 21b to the common contact 21c as to permit electric current supplied by the battery to flow into either direction signal device. Fixed contacts 47 are located near contacts 21 on the surface 18 and feed an acoustic signaling device. Fixed contacts 47 are electrically connected by movable contacts 46 disposed on the lamination or leaf spring 45 when the lamination or leaf spring 45 is pushed toward the surface 18 by the pivoting rotation of the lever 4 in a direction generally perpendicular to surface 18. Lamination or leaf spring contact 45 is secured to bottom wall 16 by rivet 61.

Figure 10:
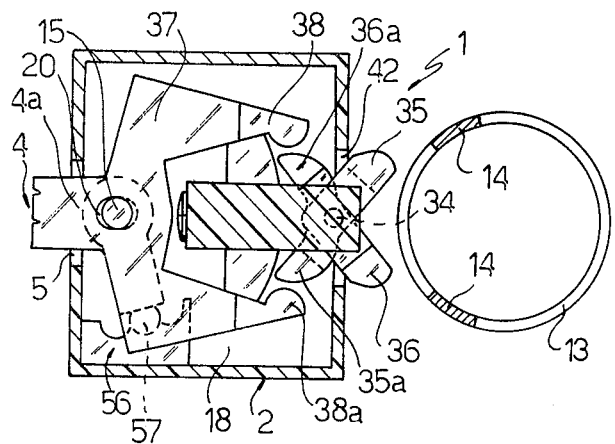
FIGS. 10, 11 and 12 are top cross-sectional views of the device of FIG. 1 in which some of the parts have been omitted for improved clarity of presentation and with each figure showing a predetermined operating position which may be assumed by the elements of the device.
Figure 11:
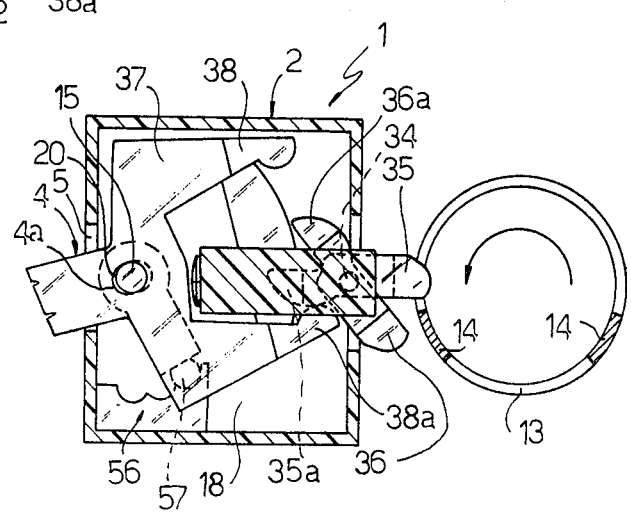
Figure 12:
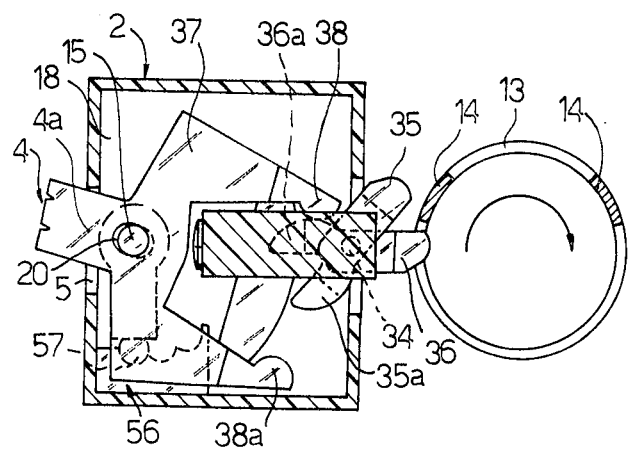

FIGS. 10, 11 and 12 disclose three different operating positions of the elements of the device shown in FIG. 1.

Let us assume that the contacts 21 are connected to the battery or the respective optical direction signaling device by means of pin 22. When the control lever 4 is in the first or intermediate rest position shown in FIG. 10, then levers 35 and 36 cannot be actuated by the stop element or return means 14. No optical signaling device is activated because the movable contact 48 is in contact only with fixed changeover contact 51. When one desires to signal a left hand turn then lever 4 is pivoted or rotated about the pin 15 in a direction generally parallel to the surface 18 so as to assume the position shown in FIG. 11. In the position shown in FIG. 11 the end 38a of the fork 37 engages the end 35a of the shaped lever 35 and causes lever 35 to rotate about pin 34 and approach the longitudinal axis of symmetry of the element 26. In the position shown in FIG. 11 the fork 37 connects the fixed contacts 21a and 21c by means of the movable contact 48 and the lever 35 interferes with the rotation of the stopping element or return means 14. As the collar 13 which is secured to the steering wheel 12 rotates in the direction indicated by the arrow it causes the element or return means 14 to strike or engage the lever 35 which returns to its original or first position shown in FIG. 10. This causes fork 37 and the lever 4 to return to the position shown in FIG. 10 because the end 35a of the lever 35 cooperates with the end 38a of the fork 37 which causes rotation of fork 37.

When one desires to signal a righthand turn he operates the device in the same manner as that described hereinbefore with the exception that he rotates the lever 4 so as to position the lever 4 as shown in FIG. 12. In the position shown in FIG. 12, the contacts 21c and 21b are connected by the movable contact 48 as the end 38 of the fork 37 cooperates with the end 36 of the lever 36 with the result that the lever 36 is rotated or pivoted so as to interfere with the stopping element or return means 14. The stopping element or return means 14 causes the lever 36 to return to the first or original position shown in FIG. 10 when the collar 13 rotates in the direction indicated by the arrow.

If one desires to prevent the device 1 from returning to the position shown in FIG. 10, then it is necessary to maintain the lever 4 in the rotated position. Consequently, when the stopping element or return means 14 interferes with or engages the lever 35 or the lever 36, it cannot cause it to rotate because the element enclosure 26 moves backwardly against the action of spring 33 and assumes the position shown in FIG. 5.

It is necessary to rotate the lever 4 perpendicularly to the surface 18 in order to actuate the acoustic signaling device. In this way, the hammer type or contact element 44 presses against the lamination or leaf spring contact 45 and bends it toward the surface 18 until the movable contacts 46 are brought to rest on the fixed contacts 47 and thus closing the circuit which feeds the horn of the vehicle.

The advantages of the present invention are clearly apparent from the foregoing. In particular, a great easiness and rapidity of assembly and disassembly of the optical signal control device is obtained which not only facilitates the manufacture but also, especially, the maintenance of the control device. The centering on the steering column takes place automatically by centering only the anti-theft, ignition switch unit because this unit and the signal control device are rigid with one another because of the single locking ring. In addition, because the control device of the present invention may also actuate the acoustic signaling device of the vehicle it is possible to have a single assembly of devices formed by the signal control device and the starting unit which all may be mounted on the locking ring. This assembly is mounted by a single operation but is capable of performing the operations of three separate units.

From the foregoing it is also clear that many variations and modifications may be made to the device of the present invention, without departing from the scope of the invention. In particular, the shape and the arrangement of components of the device may be changed and the device itself could be used only to control the optical signaling devices and/or be mounted independently from the starting device.

I claim:

1. A control apparatus for a plurality of vehicle signaling devices in combination with a vehicle steering assembly and including a rotatable steering wheel, comprising:
   a. return means associated with said steering wheel and extending therefrom and overlying a portion of said steering assembly length;
   b. said return means defining generally a circle of operability centered on said steering wheel axis of rotation;
   c. a housing positioned adjacent said circle of operability and having first and second spaced aligned opposed openings and said second opening being adjacent said circle of operability;
   d. first and second pivot pin means aligned respectively with said first and said second openings;
   e. said housing having a base and a plurality of signal contact means associated therewith;
   f. a control lever pivotably mounted to said first pivot pin means and having a first portion extending into said housing and a second portion external of said housing and being adapted for pivoting along at least a first axis;
   g. disengageable holding means associated with said housing and cooperating with said control lever for holding said control lever in any one of a plurality of pre-determined positions associated with said plurality of signal contact means;
   h. said control lever normally being held by said holding means in a first position whereby none of said signaling devices associated with said plurality of signal contact means are activated;
   i. said control lever first portion being generally fork shaped with first and second fork sections and being adapted for selectively contacting at least one of said plurality of signal contact means for establishing an electrical circuit from an electrical supply means to an associated signaling device for activitating said associated signaling device when said control lever is selectively pivoted along said at least one axis;
   j. first and second cooperating return lever means mounted to said second pivot pin means and being pivotable thereon and each of said return levers having a first portion extending into said housing and a second portion external of said housing;
   k. each of said return levers cooperating with an associated one of said fork sections when said control lever is pivoted along said at least one axis whereby one of said fork sections engages an associated return lever first position for pivoting said associated return lever second portion into said circle of operability; and,
   l. rotation of said steering wheel causing one of said return means to engage said second portion of said associated return lever for pivoting said associated return lever and whereby said associated return lever first portion engages said associated fork section for pivoting said control lever to said first position.

2. A control apparatus as defined in claim 1, wherein:
   a. said return means including a collar secured to said steering wheel and rotatable therewith; and,
   b. a plurality of spaced members extending from said collar and defining said circle of operability and for engaging said return lever means.

3. A control apparatus as defined in claim 2, wherein:
   a. said housing having a detachable cover plate opposed from said base; and,
   b. said return lever means being generally associated with said cover plate.

4. A control apparatus as defined in claim 3, further comprising:
   a. a support intergral with said cover plate and aligned with said second opening and having a base portion generally parallel to said base and said cover plate;
   b. an enclosure positioned in said support and being reciprocably displaceable on said support base portion; and,
   c. said second pivot means secured to said enclosure and displaceable therewith whereby said return lever means is displaceable with said enclosure.

5. A control apparatus as defined in claim 4, further comprising:
   a spring means extending from said support for positioning said enclosure and said return lever means whereby said control lever being secured in said anyone of said plurality of pre-determined positions when said return means engage said return lever means and said control lever second portion is selectively held by external holding means.

6. A control apparatus as defined in claim 5, further comprising:
   a. said control lever being adapted for pivoting along at least a first and second axis; and,
   b. at least one signal contact means being associated with pivoting of said control lever along said second axis.

7. A control apparatus as defined in claim 6, wherein:
   a. said at least one signal contact means including a leaf spring switch means adapted for establishing an electrical circuit between an associated signaling device and said electrical supply means when said control lever is pivoted along said second axis.

8. A control apparatus as defined in claim 7, further comprising:
   a. an arm connecting said first and second fork sections and contacting said leaf spring switch means whereby said leaf spring switch means may activate said associated signaling device when said control lever is pivoted along said first axis.

9. A control apparatus as defined in claim 8, further comprising:
   a. said control lever having an oblique bore; and,
   b. said first pivot pin means traversing said oblique bore for pivotably mounting said control lever.

10. A control apparatus as defined in claim 9, further comprising:
    a. said steering assembly having an outer fixed position column;
    b. ring means secured to said outer column; and,
    c. said housing being secured to said ring means.

11. A control apparatus as defined in claim 10, further comprising:
    a. a vehicle ignition switch secured to said ring means.

12. A control apparatus as defined in claim 10, wherein:
    a. said first and second pivot pin means being generally parallel.

13. A control apparatus as defined in claim 9, further comprising:
    a. said control lever first portion having a bore;
    b. said bore having reciprocally displaceable contact means positioned therein for establishing an electrical circuit from an electrical supply means to an associated signaling device for activating said associated signaling device when said control lever is pivoted along said at least one axis.

* * * * *